United States Patent

[11] 3,548,953

| [72] | Inventor | John D. Richardson, Sr., |
| | | 2201 Robinson Drive, Mobile, Ala. 36605 |
| [21] | Appl. No. | 795,012 |
| [22] | Filed | Jan. 29, 1969 |
| [45] | Patented | Dec. 22, 1970 |

[54] SHRUBBERY AND PLANT DIGGER
1 Claim, 3 Drawing Figs.
[52] U.S. Cl.................................................. 172/41, 172/101
[51] Int. Cl...................................................... A01b 39/10
[50] Field of Search........................................... 172/40, 41, 101, 371, 381

[56] References Cited
UNITED STATES PATENTS
1,047,607  12/1912  Bennett.......................... 172/381X
2,201,485  5/1940  Forss............................. 172/41UX
2,888,994  6/1959  Hoff et al........................ 172/41X FOREIGN PATENTS
835,480  9/1938  France.......................... 172/41
842,871  7/1960  Great Britain.................. 172/41

*Primary Examiner*— Robert E. Pulfrey
*Assistant Examiner*— Alan E. Kopecki

ABSTRACT: An agricultural application for digging up plants from the ground, the device comprising a longitudinally vibrating cutting blade at one end of a carrier tube, the tube being reciprocally moveable in a longitudinal direction by means of an eccentric drive operated by a gasoline motor.

PATENTED DEC 22 1970
3,548,953
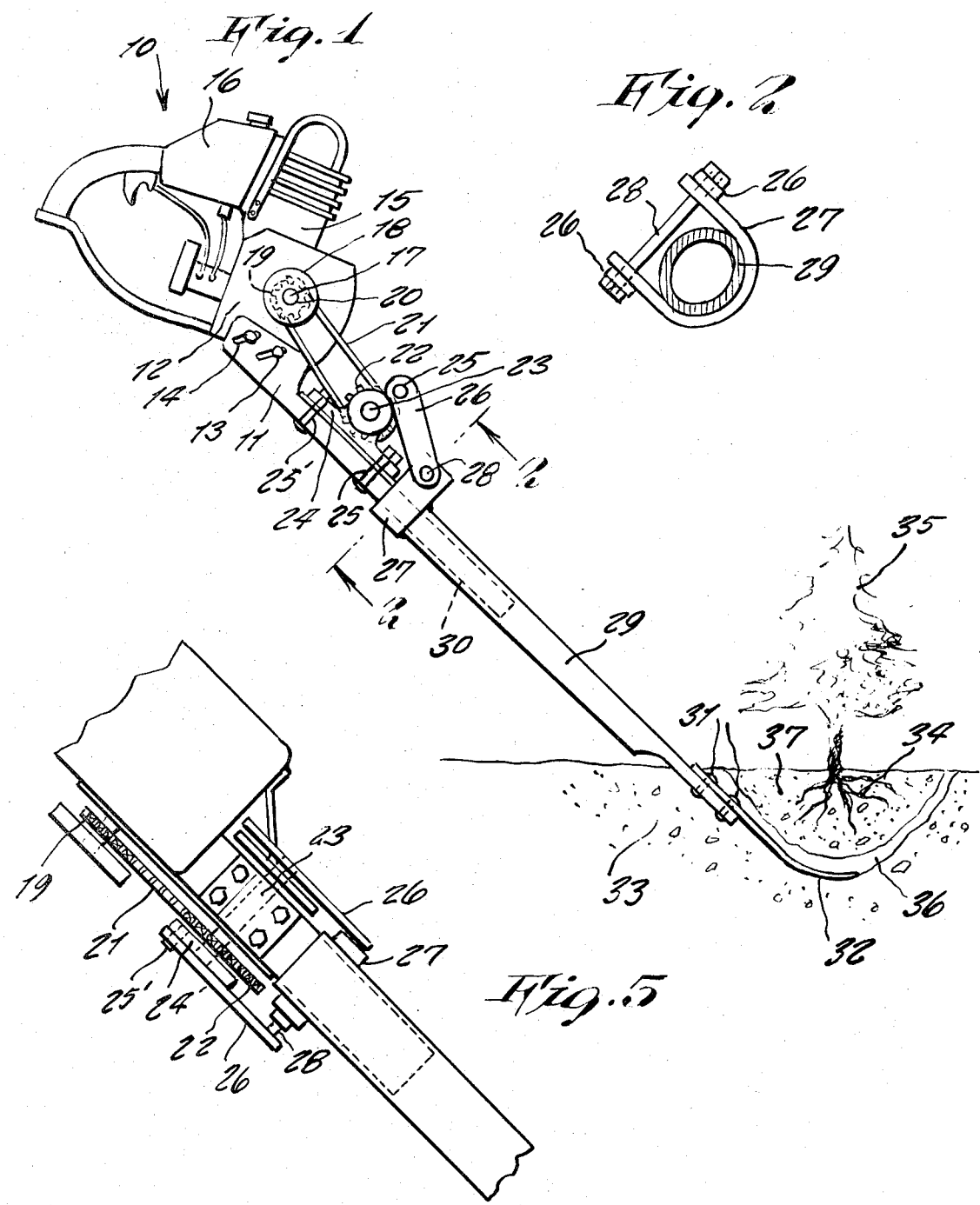
INVENTOR
JOHN D. RICHARDSON, SR.

SHRUBBERY AND PLANT DIGGER

This invention relates generally to agricultural implements and appliances. More specifically, it relates to digging apparatus.

A principle object of the present invention is to provide a readily portable shrubbery and plant digger and which will conveniently and easily separate a clump of earth containing a rooted plant from the remainder of the ground thereby permitting removal thereof for replanting.

Yet another object of the present invention is to provide a shrubbery and plant digger which can be operated by a single person while walking around the plant to be dug up.

Yet a further object of the present invention is to provide a shrubbery and plant digger which will easily penetrate the heaviest of soils and will quickly separate a clump of earth from the remainder of the ground.

Other objects of the present invention are to provide a shrubbery and plant digger which is simple in design, inexpensive to manufacture, rugged in construction, easy to use and efficient in operation.

These and other objects will become readily evident upon a study of the following specification together with the accompanying drawing wherein:

FIG. 1 is a side elevation view of the present invention shown in operative use;

FIG. 2 is a cross-sectional view taken along the line 2—2 of FIG. 1; and

FIG. 3 is a fragmentary elevation view of the device showing the drive mechanism.

Referring now to the drawing in detail, the reference numeral 10 represents a shrubbery and plant digger, according to the present invention, wherein there is a frame 11 to which there is secured adjustably a motor base 12 by means of bolts 13 extending through adjusting slots 14 of the frame 11. The motor base 12 supports a lightweight gasoline motor 15 to which there attached a handle 16 so as to conveniently maneuver the present device in operative use. A convenient gasoline tank 16 is located relatively close to the motor.

A motor output shaft 17 engages a clutch 18 so to selectively deliver power to a sprocket 19 on the clutch shaft 20, the sprocket 19 being engaged by an endless chain drive 21 that is also passed around a sprocket 22 mounted on shaft 23 supported in a bearing 24 that is secured by means of a pair of U-bolts 25 to the frame 11.

The shaft 23 also carries a plate 24' having an eccentric pin 25' therein, the eccentric pin 25' engaging one end of a connecting rod 26 which at its opposite end is connected pivotally free to a U-shaped bracket 27 by means of pins 28. The bracket 27 is firmly welded to a cylindrical carrier tube 29 that is slideably fitted over one end of a carrier guide tube 30 that is rigidly affixed to the frame 11.

The opposite end of the carrier tube 29 is connected by means of bolts 31 to one end of a cutting blade 32. The cutting blade has a terminal end that is of arcuate configuration, as is shown in FIG. 1 of the drawing.

In operative use, a workman holds the appliance at an angle such as is suggested in FIG. 1 and the cutting blade is inserted into the ground 33 so that the cutting blade is inserted below the roots 34 of a plant or shrub 35. By simply walking in a circle around the plant while the machine is in operation, the cutting blade will vibrate reciprocally in a longitudinal direction so to cut a space 36 all around the plant which will thus allow the clump of earth 37 containing the roots to be lifted upwardly from the remainder of the ground and thus allow the plant 35 to be transported to another area for transplanting.

I claim:

1. In a shrubbery and plant digger, the combination of a frame, said frame having a motor base adjustably secured thereto, said motor base supporting a lightweight gas motor, a convenient gasoline tank attached to said frame, a motor handle for convenient support of the motor and to the operator's hand, a digging mechanism and said motor having an output shaft for driving said mechanism for digging up a shrubbery or plant from the ground, said motor output shaft being selectively connected by a clutch to a clutch shaft carrying a sprocket, said sprocket being engaged by a chain drive to a second sprocket mounted upon a second sprocket shaft supported in a bracket secured by means of U-bolts to said frame, said second sprocket shaft also carrying a plate at each end, each said plate having an eccentric pin, each said eccentric pin engaging one end of a pair of connecting rods, the opposite ends of said connecting rods engaging pivotally free a bracket welded to a carrier tube, said carrier tube being longitudinally reciprocally slideable over one end of a carrier guide affixed to said frame, the opposite end of said carrier guide being connected by means of bolts to a cutting blade, said cutting blade having a terminal end which is of arcuate configuration so as to be fitted around an underside of a clump of earth containing the roots of said plant, said cutting blade being longitudinally vibrated due to said eccentric pins of said plates so to cause said cutting blade to cut a groove around said plant.